July 16, 1935.   L. McCANDLESS   2,008,460
LIQUID DISPENSING PUMP SYSTEM
Filed April 6, 1929   4 Sheets-Sheet 2
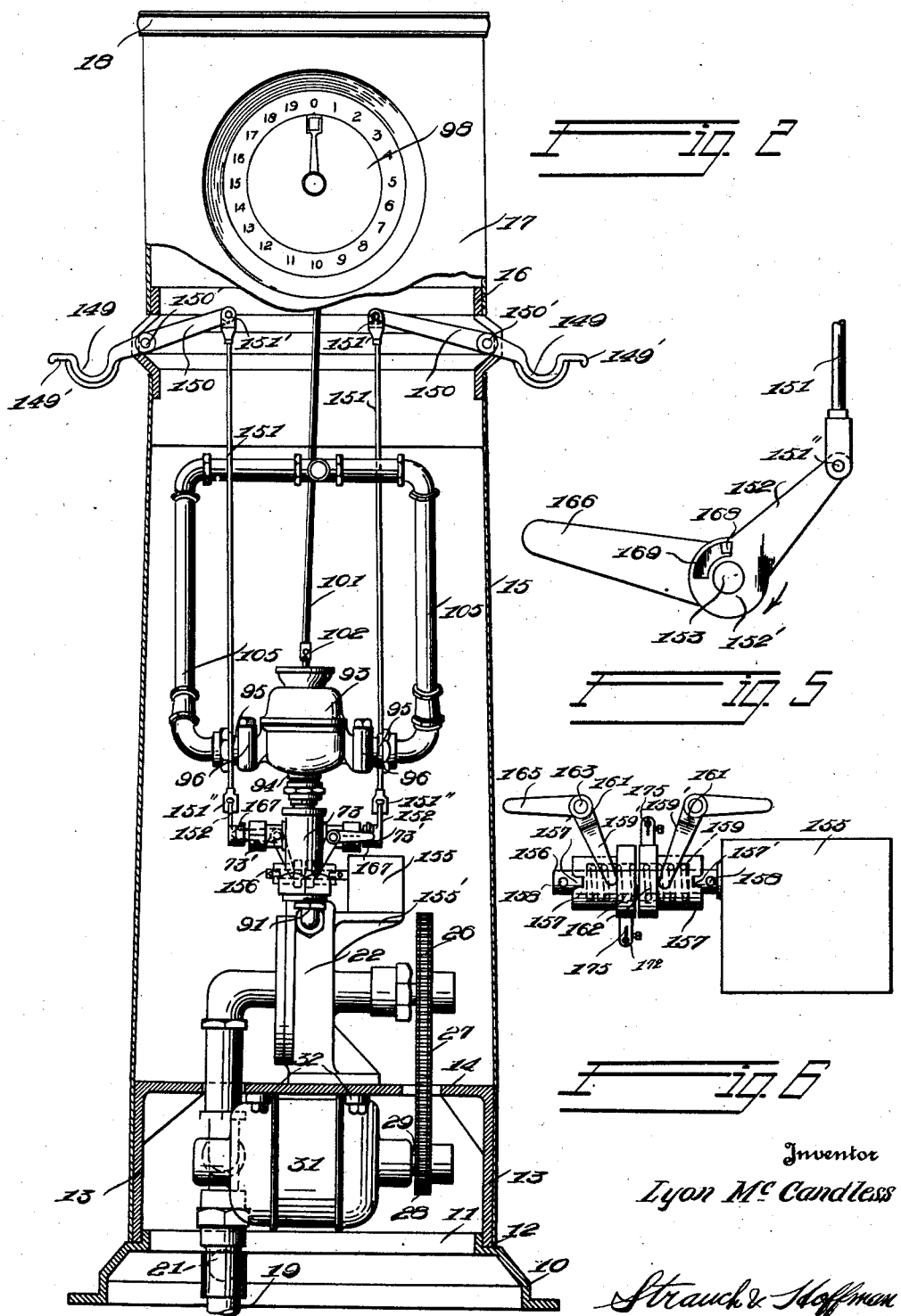
Inventor
Lyon McCandless
Strauch & Hoffman
Attorneys

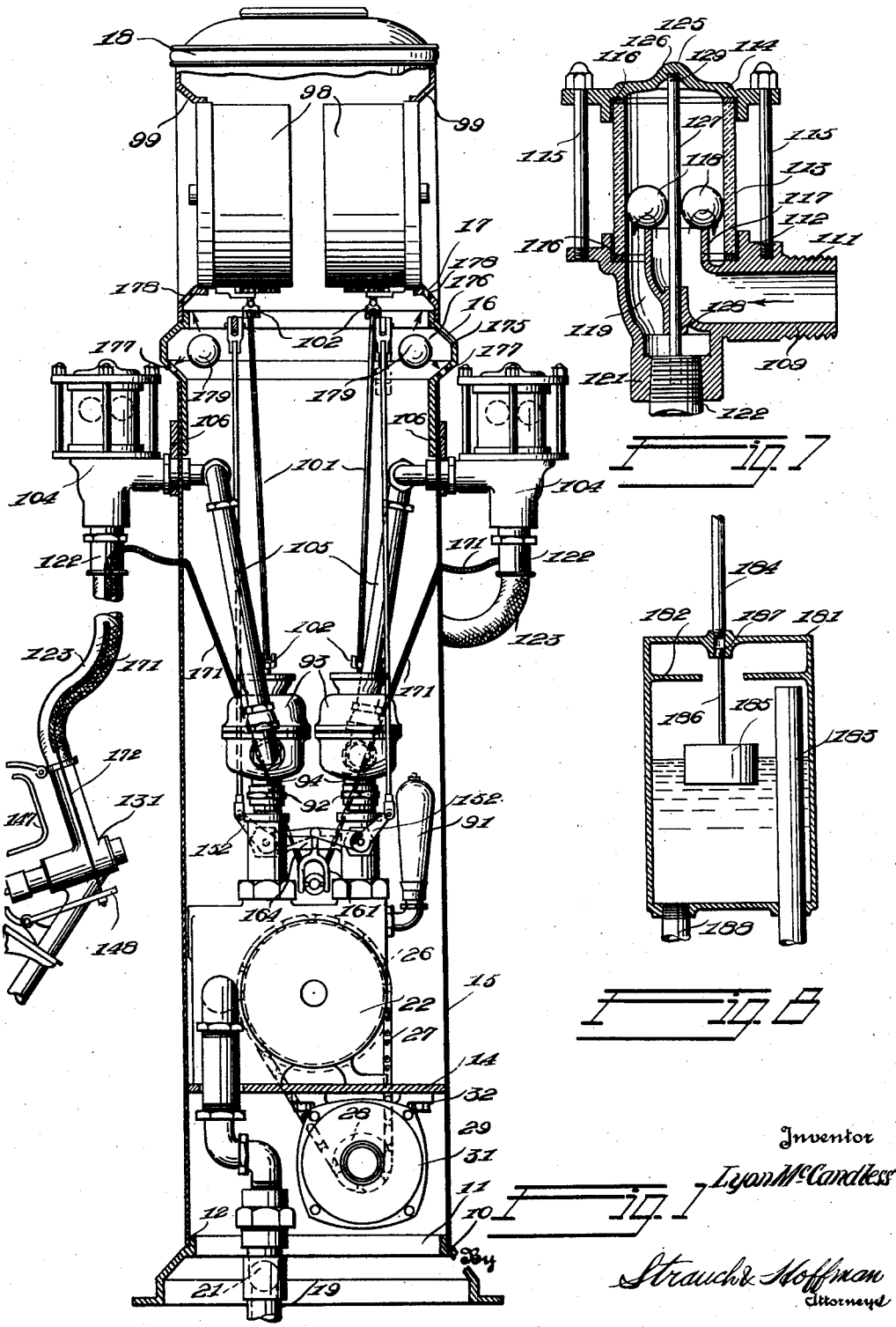

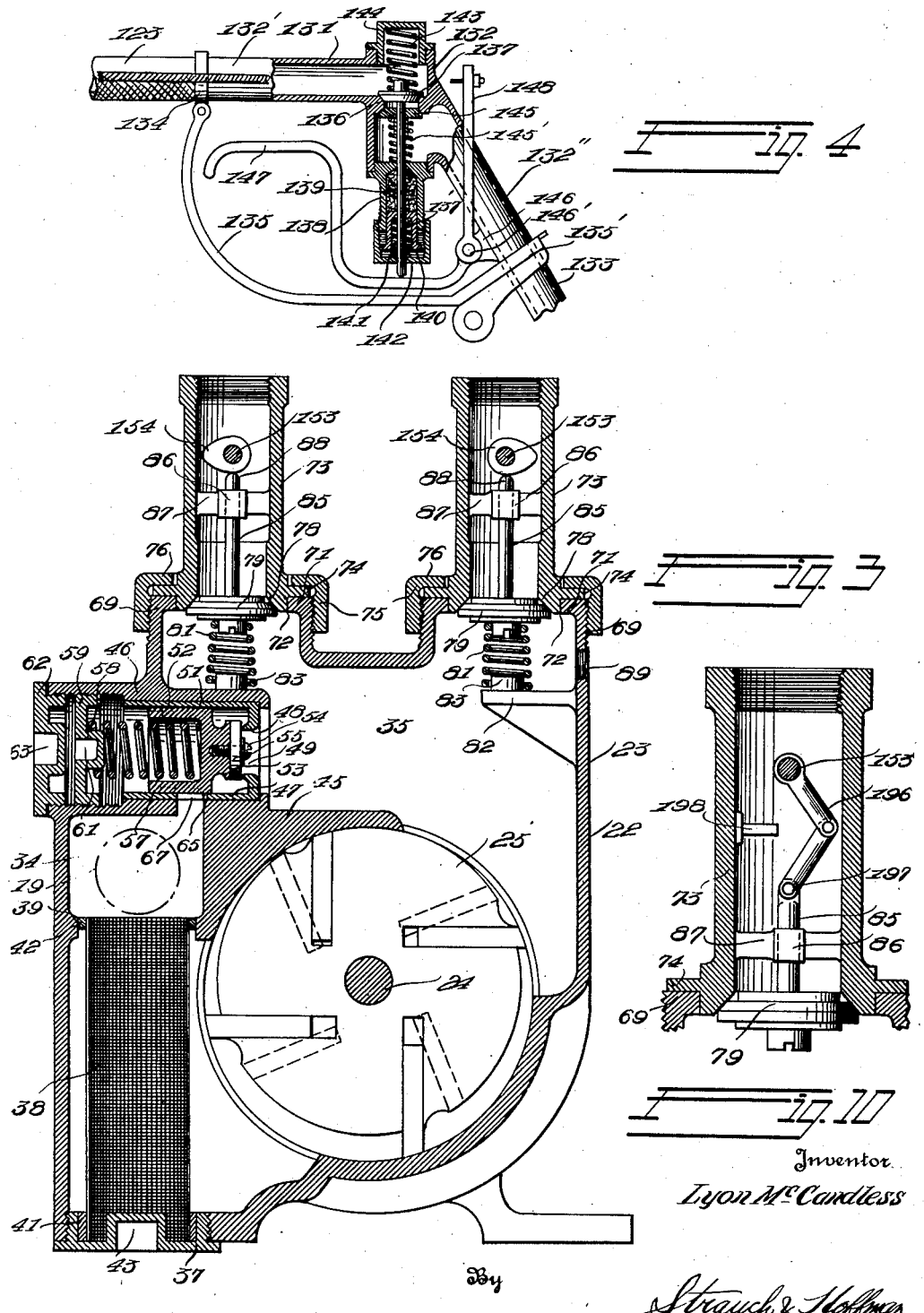

July 16, 1935.  L. McCANDLESS  2,008,460
LIQUID DISPENSING PUMP SYSTEM
Filed April 6, 1929  4 Sheets-Sheet 4
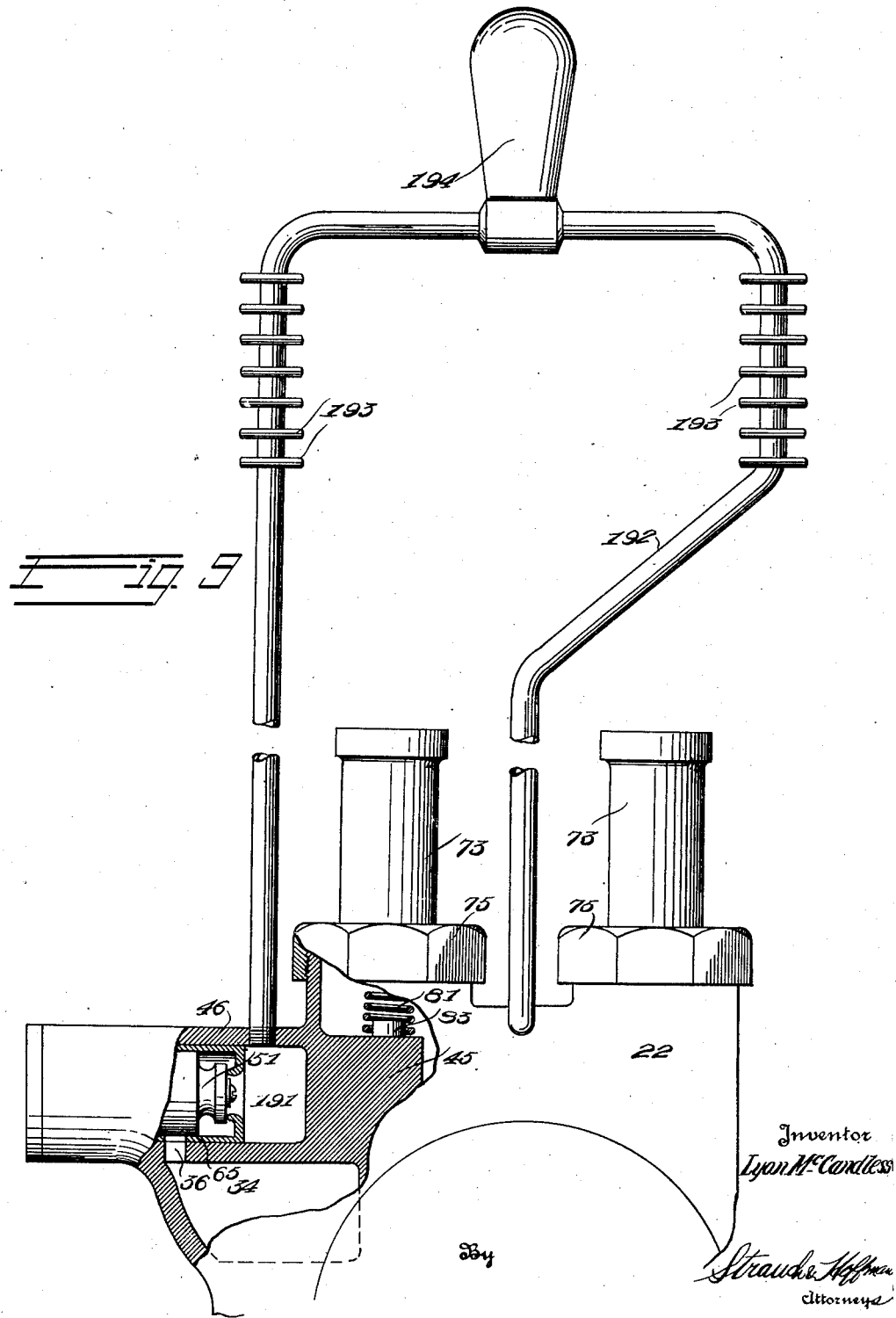

UNITED STATES PATENT OFFICE 2,008,460

LIQUID DISPENSING PUMP SYSTEM

Lyon McCandless, Pittsburgh, Pa., assignor to Pittsburgh Equitable Meter Company, Pittsburgh, Pa., a corporation of Pennsylvania Application April 6, 1929, Serial No. 353,120

36 Claims. (Cl. 221—95)

The present invention relates to a liquid dispensing pump system, and more particularly to a system for dispensing gasoline, of the type that includes a self-contained power unit and meter, said type being commonly known as "meter pumps".

Dispensing systems of this type have come into use as a result of the number of grades of gasoline that are on the market requiring installation of a number of distinct dispensing apparatuses instead of a number of dispensing devices all connected to a single system.

The first gasoline dispensing system commercially developed was of the latter type in which air pressure was utilized for forcing gasoline from a storage tank through one or a number of remote measuring meters. This system was comparatively accurate in that the air pressure could be easily controlled for effecting a constant pressure on the liquid. Consequently accurate measurement by the meter or meters was secured. This system however presented many disadvantages, because the tanks had to be constructed to withstand the required air pressure and were consequently expensive to manufacture. There was also an obvious fire hazard due to the mixing of gasoline and air under pressure. More or less complicated piping system was also necessary in this type of installation, presenting a further complication.

This dispensing system has been largely superseded by more improved systems of the type that comprise a self contained power plant in a meter housing which plant supplies relatively few or only a single dispensing outlet.

The prior systems have frequently embodied the visible type of gasoline measuring devices, and such systems are easy to handle and operate, are comparatively accurate and relatively inexpensive to build and maintain. The visible type system, however, has many disadvantages in that it is necessary to first fill the visible container with a given number of gallons of gasoline, and then dispense any number of these gallons or the entire contents of the visible container into the purchaser's tank.

Dispensing of gasoline by this system consumes considerable time in that the visible container has to be filled and then emptied through a hose, which hose should be completely drained in order that the purchaser may receive the entire contents of the visible container, or any number of gallons therefrom as indicated by designations on the container. Due to the time required for refilling the container a purchaser who is pressed for time may be content to receive the contents of the container, whereas, otherwise, he might have purchased a number of gallons equal to two or more fillings of the container were it not necessary to wait for the refilling of the same. Furthermore in this type of dispensing system a large diameter hose is required for quick draining of the container making it difficult to handle the hose in causing it to assume various draining positions. Furthermore in draining the hose there is danger of spilling some of the gasoline through overflow of the tank thus creating a fire hazard. Also, in this type of dispensing system it requires considerable time to drain the hose.

The meter pump system, to which this invention relates has numerous advantages over the visible system. One advantage is that a single supply line from the storage tank to the dispensing units is all that is needed, rather than a supply and overflow line as in the older system. Moreover, the gasoline is dispensed under pressure in the meter pump system, instead of by gravity as in the visible type. Thus indicating and totalizing registers, as well as audible alarms, can be employed for apprising the purchaser of the quantity of gasoline dispensed. In the meter pump type of system the flow of gasoline is controlled by a valve in the nozzle in view of which it is not necessary to drain the hose thus reducing the fire hazard as well as conserving time. Furthermore any quantity of gasoline up to the capacity of the storage tank could be dispensed without interruption, utilizing a smaller diameter hose in view of the fact that draining is avoided and the liquid is supplied under pressure.

In dispensing systems of this character difficulty has been experienced in maintaining a sufficiently high constant pressure to operate the meters under their most favorable operating conditions. Difficulty has also been experienced in securing proper operation due to the presence of vapor in the system. Furthermore in prior systems of this character the cooperating parts in each dispensing apparatus are assembled in such manner that unitary replacement of parts was not convenient. Other difficulties encountered in these systems lie in the manner in which the motor is controlled, and in attempts to entirely control the flow of gasoline at the nozzle, with the result that if, through inadvertence, the hose is ruptured by a moving automobile, the gasoline floods the station resulting not only in great waste but introducing a fire hazard of the most dangerous type.

One of the objects of this invention is the provision of a dispensing system which successfully meets all service and manufacturing requirements and embodies all of the above enumerated advantages and successfully overcomes the disadvantages just alluded to which are usually present in this type of dispensing systems.

Another object of this invention is the provision of a gasoline dispensing system comprising a self-contained power unit dispensing apparatus in which the control of the gasoline flow is affected so that the discharge valve at the nozzle is not alone relied upon to prevent flow of gasoline.

A still further object of this invention is the provision of a system of the above noted character in which the motor for the pump is controlled in such a way that a plurality of operations is required to put it into operation so that inadvertent operation thereof becomes extremely unlikely.

Another object of the present invention is to provide a gasoline dispensing system embodying a plurality of discharge means which may be independently or simultaneously operated at substantially the same pressure said discharge means cooperating with other means for permitting said independent or simultaneous operation.

A still further object of the invention is the provision of a dispensing system embodying by-pass means associated with a pumping unit supplying a plurality of nozzles, said by-pass means being constructed to prevent fluctuation under slight pressure changes, and operating satisfactorily to divert a portion of the flow of liquid when only a single discharge means is in operation so that the discharge from one or a plurality of nozzles takes place at a constant pressure whereby a uniform flow results without regard to whether one or both of said discharge means is in operation.

A still further object of the invention is the provision of a gasoline dispensing system embodying a pumping unit, a pair of meters, valve means between each of said meters and said pumping unit, delivery means in communication with each of said meters, power means associated with said pumping unit, a nozzle carried by each of said delivery means, supporting means for each of said nozzles, and means effective by manual manipulation upon removal of one or both of said nozzles from said supporting means for opening said valve means and rendering operative other means for setting said power means into operation.

A still further object of the invention is the provision of a gasoline dispensing system embodying means for preventing the maintenance of excessive temperatures in the system.

A still further object of the invention is to provide a gasoline dispensing system embodying means for effectively eliminating vapor in the system whereby an accurate measurement of the gasoline dispensed will be obtained.

A still further object of the invention is to provide a gasoline dispensing system embodying visible flow indicating means showing when liquid contained in the system is being discharged therefrom, said means being provided with an arrangement for automatically removing air or vapor trapped or produced in the system.

A still further object of the invention is to provide a gasoline dispensing system embodying a pumping unit, power means associated with said pumping unit, delivery means in communication with said pumping unit, a nozzle carried by each of said delivery means, a switch in circuit with said power means, and manually operable means carried by said nozzle for simultaneously closing said switch and permitting the flow of gasoline from said nozzle, after the motor circuit and the delivery means are put in condition for such operation by a previously effected manual operation of elements associated with said motor and delivery means.

With these objects in view as well as others that will become apparent in the course of the following disclosure reference will now be had to the accompanying drawings forming part of same and in which Figure 1 is a vertical sectional view of the supporting and enclosing casing showing the operating parts therein in side elevation.

Figure 2 is a vertical sectional view through a portion of the enclosing casing showing the operating parts therein in front elevation.

Figure 3 is a vertical sectional view through the pumping unit and associated by-pass and liquid flow valves.

Figure 4 is a fragmentary view partially in side elevation and partially in vertical section of a nozzle construction forming one of the elements of the invention.

Figure 5 is a side elevational view of valve operating and switch actuating means.

Figure 6 is a side elevational view of a motor controlling switch and the operating means associated therewith.

Figure 7 is a vertical sectional view of a sight glass construction embodied in my invention.

Figure 8 is a vertical sectional view of a device for the elimination of vapor from the gasoline in the system prior to the metering thereof.

Figure 9 is a partial side elevational view and partial vertical sectional view of a modified pump and by-pass construction embodying cooling means.

Figure 10 is a vertical sectional view of a modified form of liquid flow valve controlling means.

Referring to the drawings in which is exemplified one of the physical embodiments of my invention and in which like parts are designated by like reference characters, 10 designates a base adapted for support on a suitable concrete or other foundation and which is provided with an outer perimetral flange 11 defining a shoulder 12, the base 10 as well as flange 11 preferably being rectangular in plan. Supported on shoulder 12 are the inner ends of the opposite legs 13 of a motor and pump supporting bracket 14. Resting on shoulder 12 and surrounding flange 11 and legs 13 and suitably secured thereto is the lower end of a casing 15 which at the upper end thereof is suitably secured to a casting 16 which casting forms a support for mechanism later referred to. Secured telescopically to the upper edge of casting 16 is the lower end of a register supporting and enclosing casing 17 on the upper end of which is secured a base 18 for a dome of any desired form and construction or which may provide a support for any desired indicating insignia as may be desired.

The dispensing pump system includes a suction pipe line 19 which is connected with any source of supply, such as a storage tank disposed beneath base 10. Line 19, adjacent base 10, is provided with a check valve 21, which may be of any known type, said valve functioning to prevent flow of gasoline from the dispensing system back to the source of supply. Suitably supported on bracket 14 is a pump 22 with which pipe line 19 is in communication. The pump 22 is illustrated in detail in Figure 3. As indicated said pump is preferably of the rotary type, comprising a casing 23 which rotatively supports an operating shaft 24, to which is secured a suitable rotor 25. Shaft 24 is rotated through a sprocket wheel 26 having an operative connection by a sprocket chain 27 with a sprocket wheel 28 secured to the shaft 29 of a vapor proof electric motor 31 suitably secured to the under side of bracket 14 as indicated at 32.

The pump 22 comprises a suction chamber 34 and a pressure chamber 35. Suction line 19 communicates with pump 22 in the suction chamber 34, as indicated by the dot and dash line in Figure 3. Upon rotation of rotor 25 gasoline is drawn through line 19 into chamber 34 and forced into chamber 35. Pump casing 23 is provided with a detachable cap 37 below and in substantial vertical alinement with chamber 34 in which is supported the lower end of a screen 38, the upper end of which is supported in an aperture 39 provided in the base of chamber 34. The lower and upper ends of screen 38 are provided with seating and protecting rings 41 and 42 respectively arranged to snugly seat in said cap and aperture. Cap 37 is provided with a tool receiving recess 43. Upon rotation of rotor 25 the gasoline in passing from chamber 34 passes through screen 38 whereby the gasoline is freed of any suspended matter that may be carried thereby. The screen may be readily removed and cleaned by removing the cap 37, as will be obvious.

The wall 45 separating chambers 34 and 35, above rotor 25, is formed to provide a valve casing 46, in which is secured a sleeve valve 47 provided at the inner end thereof with an outwardly directed valve seat 48, surrounding a central aperture 49. Slidably disposed within sleeve 47 is a valve 51, comprising an outwardly opening, open-ended cylindrical member 52 provided with an inner head 53, to which is detachably secured, by means of a screw 54, a valve seat engaging and sealing disk member 55, normally held in seated engagement with valve seat 48 by means of a helical spring 57, the inner end of which is disposed within cylindrical member 52 in engagement with head 53, and the outer end of which surrounds an inwardly pressed boss 58 and extends into engagement with the base of an adjustable plug 59, threadedly engaged within the outer threaded end of casing 46. Plug 59 is provided with a tool receiving recess 61, whereby adjustment thereof may be readily effected. The threaded outer end of casing 46 is closed by a detachable cap 62, also provided with a tool receiving recess 63, said cap being threadedly engaged within the outer end of said casing as shown. Cylindrical portion 52 of valve 51 snugly fits sleeve 47 and is of a length sufficient to seal the chamber that contains spring 57 from chamber 34 at all positions of the valve 51. In closed position valve 51 closes a port 67 communicating with chamber 34 and another port opening through sleeve 47 from the space within sleeve 47 forwardly of cylindrical portion 52 but to the rear of disk 55, for a purpose later referred to.

Casing 23 of pump 22 above pressure chamber 35 is provided with a pair of transversely spaced outwardly projecting exteriorly threaded tubular extensions 69 each provided with an inwardly directed flange 71 surrounding a central opening 72. A valve supporting conduit 73 is supported on each extension 69, by providing each conduit with an external flange 74 adjacent the lower end thereof, said flange being designed for seating on flange 71. The lower end of the conduit extends beyond flange 74 and is disposed in opening 72. Each conduit 73 is detachably secured to extension 69 by a sleeve nut 75, threadedly engaged with extension 69 and provided with an inwardly directed flange 76, engaging with flange 74 and serving to draw same tightly into engagement with flange 71 when nut 75 is drawn up. The lower end of each conduit 73 is provided with a valve seat 78 for engagement by a valve 79. Each valve is normally firmly pressed toward said seat by means of a helical spring 81, the upper end of which engages valve 79. The lower end of the left hand spring 81, viewing Figure 3, is supported on casing 46, while the lower end of the other spring 81 is supported on a bracket 82 preferably formed integral with casing 23 of pump 22, a suitable centering projection 83 being formed on said bracket.

Each valve 79 is provided with an upwardly extending stem 85, which, adjacent the upper end thereof, is reciprocably mounted within a guide 86 carried by a bracket 87 preferably integral with conduit 73. The upper ends of stems 85 are rounded and project beyond guides 86, as indicated at 88. Casing 23 adjacent bracket 82 is, preferably, provided with a threaded recess 89 for the detachable reception of a pulsation dome 91 (Figure 2) for absorbing motor pulsations, shocks, etc. which might effect the accurate operation or might possibly damage the system. Such dome may assume any well known form.

Detachably connected with the upper internally threaded end of each of the conduits 73 by means of a suitable connection 92 is a meter 93, which is, preferably, of the nutating disk type. Each of said meters is provided with a bottom inlet 94 and a side outlet 95. Side outlets of the several meters extend in opposite directions as shown in Figure 2. Each outlet has associated therewith an adjustable by-pass 96 for by-passing a portion of the flow from the inlet around the meter, if necessary to calibrate the meters.

Supported by casing 17 are registers 98, the faces of which are visible through openings in casing 17 which openings are preferably surrounded by inwardly flared portions of casing 17, as indicated at 99. The registers fit in said openings and may be secured therein in any suitable manner. Registers 98 are, preferably, of the resetting type as disclosed in the co-pending application of Harry G. Weymouth and Earl M. Kreidler, Serial No. 249,062 filed January 24, 1928. Meters 93 are operatively connected with registers 98 by means of drive connections 101 which at the opposite ends thereof are flexibly connected with meters 93 and registers 98 by means of universal joints 102 in the manner and for the reasons disclosed in the co-pending application of Harry G. Weymouth, for Gasoline meter, filed April 6, 1929.

The outlet connection 95, of each of the meters 93, is put in communication with a sight glass construction 104 through a suitable pipe line 105, the sight glasses 104 being located on opposite sides of casing 15 and secured thereto as, for example, through the instrumentality of brackets 106. Pipe connections 105 are so disposed that sight glasses 104 are in alinement on diametrically opposite faces of casing 15. Each of the sight glasses 104, as shown in detail in Figure 7, is provided with an inlet 109, having a threaded end 111 for facilitating the attachment thereof. Each glass is provided with an upstanding shouldered portion 112 forming a seat for the glass cylinder 113 which cylinder is maintained in position by a cap 114, engaging the upper end of cylinder 113 and detachably secured to portion 112 by bolts 115. Suitable gaskets 116 are interposed between the opposite ends of cylinder 113, portion 112 and cap 116 as shown. The inlet 109 extends upwardly as at 117 to a point within cylinder 113 and, preferably, enters cylinder 113 eccentrically thereof in order to provide greater turbulence. Balls 118 of suitable material, for example, celluloid or steel are provided for indicating the liquid flow within the glass cylinder 113. A conducting portion 119 is provided for draining the gasoline from the sight glass from around the upstanding portion 117. Portion 119 terminates in an interiorly threaded portion 121 for the detachable reception of connector 122 of a discharge hose 123. Cap 114 is provided with a centrally raised or ornamental portion 125, in which is threaded, as at 126, the outer end of a tube 127, which tube extends vertically downward through cylinder 113 and through a sleeve 128 formed in a wall of portion 117. The tube 127 extends downwardly into the discharge passage in portion 121. At the highest possible point in tube 127 a number of apertures 129 opening in cylinder 113 are provided while at its end within passage 121 it is open to said passage, so that the flow therethrough sets up a suction in said tube.

Gasoline enters each sight glass through the inlet passage 109 and the upstanding portion 117, as indicated by the arrow in Figure 7 agitating the balls 118 for indicating that liquid is flowing in the system. Thence the liquid passes downwardly through passage 119, as indicated by the arrows, into the hose 123 for discharge therefrom. If any air collects in the glass 113, or should any vapor be formed at this point, the liquid passing the lower open end of the tube 127 forms a partial vacuum at this point, drawing said air or vapor through the tube 127 from the top of the sight glass through the apertures 129 at which point the air or vapor collects. Said air or vapor will thus be drawn down into the current of discharging liquid and eliminated from the system through hose 123.

Each hose 123 is provided adjacent its discharge end with a nozzle 131, the detail construction of one of which is illustrated in Figure 4. Said nozzle comprises a cylindrical casing 132 provided with a right angularly projecting hose connecting extension 132' and an obliquely disposed connection 132'' for connection to a flexible nozzle 133. Secured at one end thereof to extension 132' by a clip 134 is a hanger grip 135 whose opposite end is secured to connection 132'' as indicated at 135'.

Extensions 132' and 132'' are in communication through a port 136 in a wall in casing 132. Said port is controlled by a manually operated valve 137 provided with a stem 137' slidably disposed in a stuffing box 138, one end of which is threadedly engaged with the inner end of casing 132 and in which a packing 139 is disposed and maintained in packed condition by a follower 140 slidably disposed in box 138 and yieldably maintained in engagement with packing 139 by a helical spring 141 one end of which rests in follower 140 and the opposite end of which engages the base of a cap 142, adjustably threadedly engaged with the inner end of box 138, and through which stem 137' projects.

Valve 137 is normally maintained seated by a spring 143 one end of which engages valve 137 and the opposite end of which rests in a cap 144 threadedly engaged with the outer end of casing 132.

Port 136 is further controlled by a pressure operated valve 145, operating oppositely to valve 137 and normally closed by a spring 145' disposed between valve 145 and a wall of box 138, guide and control stem 137' of valve 137 and extending through valve 145 as indicated.

Pivotally connected to a bracket 146, carried by extension 132'', as at 146', is a bent valve stem operating trigger 147. Formed to move as a unit with trigger 147 is a Bowden wire operating arm 148.

Extension 132' of nozzle 131 forms a convenient hand grip from which trigger 147 is readily accessible for manipulation by the fingers for operating valve 137 through engagement of trigger 147 with valve stem 137'. Valve 145 is held in seated position by spring 145' with such pressure that valve 145 will not open until valve 145 is subjected to a pressure within nozzle 131, sufficient to overcome the spring 145'. In order that liquid cannot be discharged from the nozzle at a low rate of flow at which accuracy of measurement by the meter cannot be secured, valve 137 must be opened substantially before arm 148 will have moved sufficiently to start the pump, as hereinafter pointed out. Thus, bleeding of the meter is prevented and accurate measurement is assured, because the nozzle cannot be made to discharge liquid at low rates of flow for which the meter was not designed.

Accordingly, in operation of the nozzle construction, valve 137 is opened through trigger 147, but liquid will not flow from the nozzle until said valve is opened sufficiently to cause arm 148 to start the pump. Pressure then builds up in the nozzle serving to open valve 145 against the action of spring 145'. Before opening, said valve serves to keep the hose from being drained when the valve 132 is open and before the pump is started. Present practice is to provide a flow of approximately 3 to 4 gallons per minute as a minimum, though the mechanism may readily be designed for any other suitable rates of flow. Valve 134 should be opened sufficient to permit this rate of flow before arm 148 can start the pump.

Nozzles 131, when not in use, are normally supported in hooks 149 of levers 150 pivotally secured intermediate their ends as at 150' to casting 16, said nozzles causing hooks 149 to be in their lowermost position, as indicated in Figure 2, at such times. Hooks 149 are provided with extensions 149' for facilitating manual manipulation.

Said hooks control valves 79, at least, the opening thereof. To do this means are provided that upon releasing one or both nozzles 131 from hooks 149, may effect opening of one or both of the valves 79. At a predetermined later time motor 31 is set into operation both results being secured by means including a rod 151 pivotally secured at the upper end thereof to the inner end of each of the levers 150, as at 151'. The lower end of each of the rods 151 is pivotally secured at 151'' to the end of a lever 152 integral with a hub 152 fixed to a shaft 153. Each shaft 153 is rotatably journaled in a conduit 73, before referred to, and extends through a tubular lateral projection 73' of each housing. Each shaft 153 has secured thereto a cam 154 in engagement with the rounded end 88 of valve stem 85, (Figure 3) whereby when cam 154 is rotated upon rotation of shaft 153 it engages with stem 85, causing the valve 79 to open against the action of spring 81. The shaft 153 is rotated upon downward movement of rod 151 through lever 152, which movement may be caused by manually pushing upward on either extension 149' of hook 149 simultaneously with the taking of either nozzle 131 from said hook.

A switch 155 is supported on a bracket 155' carried by pump casing 23 and disposed centrally opposite the space between conduits 73. Said switch is provided with an operating shaft 156 projecting therefrom. Upon rotation of said shaft, switch 155, which is in electrical connection with motor 31, is closed for effecting operation of the motor. Slidably disposed on shaft 156 are oppositely facing clutch socket members 157, each provided on the outer closed end thereof with a slot 157' for engagement by a pin 158 carried by shaft 156. A coil spring 159 surrounds shaft 156 and is nested within socket members 157, serving to urge the same away from each other so that their respective slots 157' engage pins 158. If either member 157 engages pin 158, and is itself rotated, shaft 156 will be rotated and the switch 155 closed thus setting motor 31 into operation. Members 157 are normally held toward each other against the action of spring 159 with slots 157' and pins 158 out of engagement, by means of arms 159' of bifurcated levers 161 engaging collars 162 integral with members 157. The bifurcated levers 161 are pivoted at 163 to brackets 164 (Figure 1) extending from conduits 73. Each of the levers 161 comprises an arm 165 normally engaged by the end of an arm 166 provided with a hub 167 rotatably mounted on shaft 153 and provided with a laterally projecting pin 168, engaged in a segmental slot 169 in hub 152' of arm 152. Upon rotation of hub 152', in the direction of the arrow indicated in Figure 5, for opening valve 79, by virtue of the downward movement of rod 151, pin 168 will be permitted movement in the same direction allowing members 157 to separate because of the expansive tendencies of spring 159, which causes arms 165 to bear firmly on arms 166. When arm 166 of either mechanism is permitted to rise, viewing Figure 5, spring 159 causes lever 165 to follow it, thus bringing sleeve 157 in clutching engagement with shaft 156. Upon opposite movement of either link 151, the initial movement thereof will not operate arm 166 because the slot 169 permits the pin 168 to move through said slot but when said pin reaches the end of said slot, arm 166 will be pressed down upon arm 165 releasing clutch sleeve 157 from engagement with pin 158.

Pin 168 reaches the other end of slot 169 from that illustrated in Figure 5 during the movement of arm 152 in the direction of the arrow appearing in said figure due to the fact that the travel of arm 152 exceeds that necessary to permit the clutch 157 to travel to its operative position. When clutch 157 reaches the end of its movement spring 159 has no further effect on the arm 166 and arm 152 moves with respect to arm 166, this action causing the pin 168 to move through slot 169. Upon reverse movement of lever 152 caused by placing the nozzle on hook 149, the initial movement of said lever does not affect clutch 157, though movement of said arm causes the valve controlled by it to close by withdrawing cam 154 which holds it open as long as hook 149 is elevated.

Co-extensive with each hose 123 and suitably secured thereto is a flexible conduit 171 through which extends a Bowden wire 172, which, at one end thereof, is connected to arm 148, before referred to. The other end of the wire 172 for each nozzle is extended downwardly within casing 15 and adjustably attached to an extension 175 of collar 162 by being inserted in a slit in said extension and held in position in said slit by a set screw (Figure 6). Upon release of one or both nozzles 131 from hooks 149 and manipulation of said hooks, the opening of valve 79 results, and clutching engagement of one or both members 157 with shaft 156 through cooperating slots 157' and pins 158 takes place. Shaft 156 may then be rotated for closing the switch 155, in order to set motor 31 into operation. This is brought about upon manipulation of trigger 147, which not only actuates nozzle control valve 137, but through arm 148 pulls on wire 172 rotating shaft 156 for effecting closing of rotary switch 155 against the action of a spring tending to hold it open. The lengths of the Bowden wires are adjusted by moving them through the slots formed in extensions 175 so as to provide sufficient looseness in the wire between each of the arms 148 and each extension 175 so that trigger 147 must be moved substantially, opening valve 137 sufficiently to give at least the minimum flow that will be accurately measured by the meter, when the pump is put in operation. This occurs after arm 148 has been moved to take up the looseness in the Bowden wire to which it is connected. Further movement will cause the switch shaft 156 to be rotated in opposition to the spring that tends to hold said shaft in the position at which the switch is open, and the pump will thus be set in operation. It will be understood, that, if desired, the Bowden wires may control clutches that serve to operatively connect a motor, that may be put in operation in any desired manner, with a pump. In such an arrangement, it is essential that sufficient looseness be provided in the length of the control wire to insure opening of the valve 137 prior to the operation of the clutch as above pointed out.

Because of the provision of the valve and switch control means above described, it will be seen that when nozzles 131 are in position in hooks 149, depressing said hooks, as indicated in Figure 2, that the motor cannot be set into operation even though trigger 147 were actuated for the reason that in this position members 157 are out of clutching engagement with shaft 156, as a result of which any rotary motion imparted to one or both of the members 157 would not impart rotation to shaft 156. When the nozzle is withdrawn the hook 149 must be manually pushed upwardly or the motor can not be set into operation even if trigger 147 is actuated, because upward movement of hook 149 to open valve 79 and to throw member 157 into clutching engagement with shaft 156 must first take place. Shaft 156 may accordingly be rotated through wire 172 controlled by trigger 149 on one or the other of nozzles 131 only after manual operation of hook 149. It will also be seen from inspection of Figure 6, that if both nozzles are released at the same time switch 155, will be operated through rotation of either shaft 156 or even by simultaneous operation of wire connections 172. The capacity of the pump is sufficient to supply both outlets simultaneously at the desired rate.

The construction described provides a control means with a high safety factor, complying with the laws relative to constructions of this character, whereby the motor 31 cannot be inadvertently or intentionally set into operation until the nozzle hook is manually operated and the nozzle then opened to discharge the gasoline. At such time valve 137 is opened upon pressure on trigger 147 and subsequently arm 148 becomes effective to operate switch 155 through the associated Bowden wire connection 172 as above described. However liquid will not drain from the nozzle until valve 145 is opened by pressure within the nozzle.

Casting 16 is as indicated in Figures 1 and 2 provided with an outwardly projecting portion 175, defining an inner channel 176. The bottom sloping wall of portion 175 is provided with a slot 177 adjacent each of the sight glasses 104, and the inwardly flared portion 99 of casing 17 is provided with a slot 178 vertically above each of the slots 177 and adjacent the bottom of the face of each of the registers 98. A light 179 is located in channel 176 in proximity to each pair of vertically disposed slots whereby light rays therefrom pass through slots 177 and 178 illuminating the faces of registers 98 and the sight glasses 104 in order that the register indications and movement of balls 118 can be observed at night.

Pump 22, motor 31, valve conduits 73 with the associated valves and meters 93, together with the associated parts are preferably assembled for distribution and assembly as a unit, such unitary construction facilitating installation in casings in use as a part of other dispensing systems. Such units are capable of ready connection with registers through flexible connections 101, by means of which the registers are accurately driven by the meters without requiring undue care in alining the registers. The outlet connections of the meters can be readily put into communication with the sight glasses 104. Rods 151 which may be adjustable or constructed in different lengths to permit a ready connection between levers 150 and arms 152 of the valve actuating mechanism, when the improved system of this application is applied to casings not specially designed for it.

In the gasoline dispensing system described the pump 22, meters 93, interconnecting pipe lines and hose 123 are always filled with gasoline from foot valve 21 to nozzle control valves 137 and 145. In operation when it is desired to dispense a quantity of gasoline nozzle 131 is withdrawn from hook 149. Hook 149 is then manually forced upwardly through extension 149', which, through lever 150, moves rod 151 downwardly which, in turn, through arm 152 imparts rotation to shaft 153 through hub 152' producing a like rotation of cam 154, forcing valve stem 85 downwardly unseating valve 79 thus establishing communication between pressure chamber 35 of pump 22 and the respective meter 93. After inserting nozzle extension 133 into the tank or other receiving vessel, valve 137 is opened upon movement of trigger 147 which, after valve 137 has been substantially opened, arm 148 imparts rotation to switch shaft 156 through the Bowden wire connection 172, the respective member 157 having been forced into clutching engagement with shaft 156 by rotation of hub 152' permitting movement of arm 166 and allowing lever 161 to move out of engagement with collar 162 as above described. Upon closing switch 155, motor 31 is set in operation, said motor through cooperating sprockets 26 and 28 and sprocket chain 27 imparting rotation to rotor 25 of pump 22. Said pump causes a flow of gasoline from suction pipe line 19 into chamber 34, through screen 38, into chamber 35, from which it is forced outwardly through conduit 73, meter 93, pipe connection 105, sight glass 104, hose 123 and nozzle 131.

In the operation of pump 22, valve 51 is constructed in the manner above set forth, for the purpose of preventing chattering and ineffective and improper operation. In the usual type of by-pass valve the valve opens and closes immediately upon slight changes of pressure, resulting in a noisy or fluttering operation of the valve upon slight unavoidable variations in the pressure and a considerable further resultant variation in the pressure throughout the system from this cause. In accordance with the by-pass construction of this application, the variation is considerably reduced and a higher pressure is maintained in the system at all times, even with both nozzles open. Thus, for example, if spring 57 is adjusted for a certain pressure and the area of valve member 55 is one square inch, then the valve will open when the pressure in chamber 35 reaches said certain pressure. With the valve structure disclosed liquid cannot pass however from chamber 35 to chamber 34, when member 55 becomes unseated on account of cylindrical portion 52 which is slidably disposed in sleeve 47. When the valve 55 is unseated the pressure becomes immediately effective over a larger area, becoming effective over an area equal to the sectional area of the larger cylindrical portion 52. Such increased pressure causes valve to open with a snap action since the area differentials are proportioned so that the increased pressure exerted by the spring by reason of its compression due to the initial movement of member 52 will be wholly insufficient to resist the increase in pressure over the pressure at which said member is initially caused to move. The valve will accordingly open the by-pass quickly and the valve 55 will remain open until the pressure falls a substantial amount below the pressure for which spring 57 is adjusted. Thus it will be seen that the by-pass valve will open with certainty and will not fluctuate upon any slight drop in pressures. To calibrate meter in factory, suction must have no substantial effect on low pressure side of by-pass valve so that variable vacuum set up by pumps in practice will not vary effect of by-pass spring. The cylindrical portion 52 of the valve prevents access of the pressure to the chamber in which spring 58 is housed.

In the usual dual meter system employing two nozzles and a single pump, the meters are operated under a wider range of pressures. The meters employed in dispensing pumps of this character are usually of the nutating disk type, the accuracy of which is largely dependent on the maintenance of a constant pressure and uniform flow. It will therefore be seen that in such systems the meters will not measure as accurately when one nozzle is open, as when both nozzles are open.

In accordance with this invention the same accuracy is obtained irrespective of whether one or both nozzles are open. This is accomplished by providing a pump of larger capacity than that commonly employed and with the by-pass valve set for a pressure which will give a rate of flow which may be maintained whether one or both nozzles are open. In the system disclosed, the by-pass valve provides for by-passing about half of the pump capacity when one nozzle is open and the valve is completely closed when both nozzles are open, instead of maintaining the bypass valve closed unless both nozzles are closed.

The by-pass valve of this invention accordingly functions as a pressure regulator in connection with the pump, which has sufficient capacity as just stated, to maintain the maximum pressure desired whether one or both nozzles are open. During operation of pump 22, motor pulsations, shocks, etc. are thus absorbed, avoiding possible inaccurate operation or damage to the system.

As gasoline is being dispensed balls 118 move about within cylinder 113 for indicating a flow of gasoline through the system and the sight glass 104, which is located at the highest point in the system, affords a means for readily ascertaining whether any of the gasoline is draining back through a leaky foot valve or other connection in the system.

When the desired quantity of gasoline has been dispensed nozzle 131 is placed in the corresponding hook 149, forcing lever 150 upwardly, which through rod 151 imparts rotation to shaft 153 moving cam 154 and allowing valve stem 85 to move upwardly through the expansive action of spring 81 for reseating valve 79, and, as hub 152' is rotated in a direction opposite to that indicated by the arrow in Fig. 5, pin 168 is engaged by the end of slot 169 forcing arm 166 downwardly into engagement with arm 165 rocking lever 161 on its pivot 163, causing arms 159 to force member 157 through engagement with collar 162 out of clutching engagement with shaft 156. The spring of the switch then returns it to its open position.

As air or vapor will register on most meters just as will liquid, it may be desirable to provide a device for the elimination of any air or vapor in the lines or chambers between the pump 22 and the meters 93. Such a device may be conveniently inserted by suitable fittings between the valve conduit 73 and meters 93. A device suitable for this purpose is illustrated in Figure 8. It consists essentially of a container 181 provided with any desired number of baffle plates 182 so disposed that a pipe line 183 which is connected into the supply line forces the gasoline against the baffle plates 182, thereby releasing the gas or vapor upwardly, the liquid falling to the bottom of the container 181. A pipe line 184 is secured in an opening in the outer wall of container 181 and is in communication with the atmosphere or is connected to a suitable vent or to the supply tank or reservoir or discharge line so that any vapor or air may be either vented or returned to the supply tank from which the air may be vented.

A float 185 carrying a control valve may be provided. Said float is guided for vertical movement by any suitable means, as by a guide stem 186. Said stem is provided with a valve 187 adapted to close communication between container 181 and conduit 184 after a suitable amount of gasoline is introduced into container 181, after which continuation of operation of the pump will force the gasoline through pipe line 188 to the corresponding meter 93.

In the operation of constructions of the character disclosed, embodying a pump provided with a by-pass valve, when the by-pass valve is open, and some of the liquid is circulating around the pump some of the energy is dissipated in the form of heat resulting in a rise of temperature of the circulating gasoline. Furthermore, the suction action on the liquid and the turbulence caused by the pump may jointly cause some of the gasoline to be converted from liquid into gas or vapor. For this reason it is desirable in some instances to modify the pump structure, as illustrated in Figure 9. This modification includes a cooling coil in the system to condense the vapors caused by the conditions just stated. In this form of the invention, wall 45 is extended outwardly closing direct communication between chambers 34 and 35 and the by-pass valve structure, said wall providing with casing 46 a separate chamber 191 in front of valve 51, communicating with chamber 34 through port 36. Upon movement of disk member 65 and valve 51, chambers 35 and 191 are in communication through pipe line or conduit 192 which may conveniently extend upwardly within casing 15 to a high point in the system. The outer portion of conduit 192 preferably is of loop formation with opposite branches thereof provided with cooling fins 193. An expansion chamber 194 is incorporated in conduit 192 between the fin bearing branches thereof. With this construction when the pump is by-passing liquid the liquid flows from chamber 35 upwardly through conduit 192 and downwardly therethrough into chamber 191 and thence through port 36, chamber 34 and to the pump. During its passage through the loop just described the liquid that is by-passed, is sufficiently cooled to condense any vapors or gases formed therein.

In Figure 10 is illustrated a modified form of valve actuating means, wherein cam 148 is replaced by a toggle member 196 one link of which is fixed to shaft 153 and the other link of which is pivotally connected to the outer end of valve stem 85, as indicated at 197. Secured to the wall of conduit 73 opposite the toggle link pivot is a stop 198 which terminates just short of the point reached by said links when they are exactly in alinement for limiting the movement of toggle member 196. The links accordingly move slightly beyond their alined position holding the valve open in this position.

In the operation of this form of valve actuating means upon rotation of shaft 153, toggle member 196 will move towards stop 198 moving valve stem 85 downwardly thus unseating valve 79. When the toggle links engage stop 198 valve is completely open. It remains open until shaft 153 is operated in the reverse direction upon downward movement of the associated nozzle hook 149 when member 196 will move in the opposite direction causing valve 79 to be firmly and positively closed. The action in this form of the invention is positive whereas in the form of the invention shown in Figure 3 springs are relied upon to close the valves.

It will be seen from the foregoing disclosure that a gasoline dispensing system is provided which meets all manufacturing and operating requirements and is adapted for an expeditious delivery of gasoline and comprises in the construction thereof means whereby the pumping unit cannot be inadvertantly set into operation or gasoline inadvertantly discharged from the nozzles.

The system of this application while comparatively simple in construction embodies simple and easily actuated means within the control of an operator, whereby the pumping unit will not be set into operation nor gasoline dispensed until the nozzle is properly located for delivery and said control means providing a substantially uniform flow of gasoline whether one or both delivery hose are in operation resulting in an accurate measurement by the meters thus satisfying both the vendor and the purchaser as well as complying with the requirements of the law.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range or equivalency of the claims are therefore intended to be embraced therein.

What I claim and desire to secure by U. S. Letters Patent is:

1. In a liquid dispensing system, the combination of a supply line; a pump in communication with said supply line; power means for operating said pump; a meter associated with said pump, valve means normally closing communication between said pump and said meter; a switch for controlling the operation of said power means; clutch mechanism associated with said switch; delivery means in communication with said meter comprising a nozzle; supporting means for said nozzle; means associated with said supporting means adapted upon release of said nozzle for opening said valve means and permitting engagement of said switch clutch means; and means carried by said nozzle for effecting operation of said switch.

2. The combination defined in claim 1 in which said switch comprises an operating shaft and in which said clutch means comprises a pair of socket members loosely mounted on said shaft; grooves in the opposite ends of said socket members for receiving pins carried by said shaft; a coil spring seated in said socket members for urging said socket members apart for seating engagement of said pins in said grooves; and collars on said socket members for operating the same.

3. In a liquid dispensing system, the combination of a liquid supply line; a pump in communication with said supply line; a valve controlled outlet connection in said pump; a meter in communication with said outlet connection; a hose in communication with said meter; a nozzle on said hose; a motor for operating said pump; a switch in connection with said motor; means for operating said switch including a disengageable clutch, a supporting means for said nozzle; means associated with said supporting means for opening the valve in said pump outlet connection and causing clutching engagement of said switch upon manual movement of said supporting means when releasing the nozzle therefrom; and manually operable means associated with said nozzle for simultaneously operating said switch through said clutching means and permitting the flow of liquid therefrom.

4. In a gasoline dispensing system, a pump; a motor operatively connected to operate said pump; valve housings in communication with said pump; a valve in each of said housings; each of said valves being normally closed by yieldable means; a meter in communication with each of said housings; a delivery hose in communication with each of said meters; a nozzle carried by the end of each of said hose; switch means for controlling said pump, said switch means embodying clutch mechanism; a hook support for each of said nozzles; means operative upon manual manipulation of either of said hook supports upon release of the nozzle therefrom for opening one of said valves in the associated valve housing and simultaneously permitting clutching engagement of said clutch means; and manually operable means associated with each of said nozzles for operating said switch and permitting the flow of gasoline therefrom.

5. The combination defined in claim 10 in which said switch comprises a rotatable operating shaft and in which said clutch means comprises a pair of socket members loosely mounted on said shaft, said socket members provided with notches on the opposite ends thereof for engagement by pins carried by said shaft, yieldable means within said socket members normally urging said socket members apart for engagement of said pins in said notches for connecting said socket members with said shaft for rotation therewith, said socket members provided with collars, bell crank levers having corresponding arms thereof normally engaged with said collars for holding said socket members out of clutching engagement with said shaft against the action of said yieldable means, the other arms of said bell crank levers being engaged by said means operable upon manipulation of said nozzle supporting hooks.

6. In a gasoline dispensing system, the combination of a plurality of discharging means each having a valve therein; a meter in communication with each of said discharging means; a single pump for supplying liquid to all of said meters; valves for controlling the flow of liquid from said pump to said meters; power means operatively connected with said pump; a switch for controlling the operation of said power means; clutch means normally maintaining said switch in inoperative condition; manually operable means for simultaneously operating said valves and causing engagement of said clutch means for placing said switch in condition for the operation; and means associated with said discharge means for operating said switch and operating the valve therein, thus permitting the flow of gasoline from said discharge means.

7. In a gasoline dispensing system, the combination of a pump in communication with a source of supply; a meter for measuring the discharge of liquid from said supply; a normally closed valve between said pump and said meter for controlling the supply of liquid to said meter; a hose in communication with said meter; power means in operative connection with said pump; normally inoperative switch means for controlling the operation of said power means; a support for maintaining said hose in inoperative position; means operatively connected with said support adapted upon manual movement of said support upon the release of said hose therefrom for opening said valve and rendering said switch means in condition for operation and means associated with said hose for operating said switch means.

8. A liquid dispensing apparatus comprising a vertically disposed housing; a bracket disposed in the base of said housing; a motor and a pump driven thereby supported by said bracket; a pair of conduits connected with said pump; a valve normally closing each of said conduits; a valve operating shaft extending through each of said conduits and rotatably journaled therein; means carried by each of said shafts for engagement with the associated valve upon rotation of said shaft for opening said valve; a meter connected to and in communication with each of said conduits; a spring switch for said motor comprising a rotatable switch shaft; a yieldable clutch associated with said switch shaft; visible flow indicating means communicating with said meters; a hose connected with each of said indicating means; a nozzle carried by each of said hose; levers pivotally supported in said housing; a nozzle supporting hook on the outer end of each of said levers for supporting said nozzles when not in dispensing operation; an arm secured to each of said valve operating shafts; rods connecting the inner ends of said levers with said arms; another arm loosely mounted on each of said valve operating shafts and limited in movement by said first arm; levers normally maintaining said clutch in inoperative position by engagement of said second arms therewith whereby upon manual upward movement of one or both of said hooks the corresponding valves in said conduits are opened by rotation of said valve operating shafts through said first arms simultaneously with which said second arms are permitted movement for effecting operative engagement of said clutch; and means associated with each of said nozzles for operating said switch and permitting liquid flow from said nozzle.

9. A liquid dispensing system, including a delivery hose, means to supply liquid under pressure to said hose, a valve to control the flow of liquid from said hose, mechanism to initiate the operation of said means, and elements interconnecting said valve and mechanism to cause said valve to open to a substantial degree and to then operate said mechanism.

10. In a liquid dispensing system, the combination of a liquid supply line for connection with a source of liquid supply, a pump disposed in said supply line for pumping liquid therethrough, a discharge hose connected to said pump, a dispensing nozzle carried by said hose, a normally closed valve in said dispensing nozzle, an electric switch controlling operation of said pump, means for operating said switch including a disengageable clutch, manually operated means for engaging the clutch, and common means for opening the normally closed discharge nozzle valve and operating said electric switch.

11. The invention as defined in claim 10 wherein said manually operated means includes a hook for the reception of said discharge nozzle when not in use, and means connecting said hook and clutch whereby said clutch is disengaged when said discharge nozzle is placed on said hook.

12. The invention as defined in claim 10 wherein a spring normally closes said clutch, said manually operated means includes a hook for normally receiving the dispensing nozzle when not in use, and a lost motion connection between said hook and said clutch.

13. A liquid dispensing system comprising a supply means, a pump, a meter and a delivery means connected in series in the order named, power means for driving said pump, a valve disposed between said pump and said meter, another valve in said delivery means, independent means to operate each of said valves, and means interconnected with each of said valve operating means for controlling said power means.

14. The invention as defined in claim 13 wherein the means for controlling said power means is operated only by a predetermined sequential operation of said valve means.

15. The invention as defined in claim 13 wherein the means for controlling said power means is initiated by opening movement of said valve between the pump and the meter, and is completed by opening movement of the valve in said delivery means.

16. The invention as defined in claim 13 wherein the means for controlling said power means includes a disengageable clutch engaged upon opening movement of one of said valves.

17. The invention as defined in claim 39 wherein the means for controlling said power means includes a disengageable clutch engaged upon opening movement of one of said valves and opening movement of the other of said valves energizes said power means.

18. In a liquid dispensing system, a liquid delivery line terminating in a discharge hose, a discharge nozzle connected thereto, two normally closed valves in said delivery line, one of said valves being opened by the flow of fluid through said delivery line, means to supply liquid under pressure to said hose, and manually operable mechanism for opening the other of said valves and for initiating the operation of said liquid supply means, said mechanism being so arranged that said manually operated valve is opened a substantial degree prior to operation of said liquid supply means.

19. In a liquid dispensing system, a liquid supply line, a discharge nozzle connected to said supply line, two normally closed valves in said discharge nozzle, manually operable means for opening one of said valves, the other of said valves being opened by flow of fluid in said discharge nozzle, a third normally closed valve in said supply line, and manual means for opening said third valve, said means being released for operation by bodily movement of said discharge nozzle from its inoperative position.

20. In liquid delivery apparatus, the combination of a delivery line including a hose having a nozzle and an actuating handle on said nozzle, a support for said nozzle when not in use, an electric pump for supplying liquid to the line, a controlling switch for said electric pump located at a point removed from the nozzle, a flexible mechanical connection along the hose for actuating said switch from the nozzle handle and coupling means for establishing a driving relation from the nozzle handle through the flexible mechanical connection to the switch, said coupling means including a pickup device normally inoperative when the hose is on said support, but operative to effect a positive driving relation when the nozzle handle is actuated.

21. In liquid delivery apparatus, a delivery line including a hose having a nozzle, a support for said nozzle when not in use, an electric pump for supplying liquid in the delivery line, a switch for controlling said pump located at a point removed from the nozzle, a flexible mechanical connection along the hose, a loose coupling between said flexible mechanical connection and switch inoperative to transmit motion from the flexible mechanical connection to the switch when the hose is on said support and means at the nozzle end of the hose for actuating said flexible mechanical connection.

22. In liquid dispensing apparatus, the combination with a liquid supply pump; of an electric switch adapted to control the operation of said pump; a hose connected at one end with said pump and having a nozzle at its other end remote from said switch; a lever at the nozzle end of said hose; a cable extending along the hose, attached at one end to said lever, and having means at the other end for operative connection with said switch; a movable support for said hose; and means operable by movement of said hose support, to alternately operatively connect said cable with said switch and to disconnect said cable from said switch.

23. In liquid dispensing systems, the combination of a liquid dispensing hose having a nozzle valve, flow regulating means for controlling delivery of liquid through the hose, a flexible mechanical connection extending from the nozzle structure back along the hose for actuating said flow regulating means, means for actuating said nozzle valve and mechanical connection and including connecting means normally disconnected and inoperative to transmit motion from said first means to said flow regulating means when the hose is not in use, but positively operative to transmit such motion upon definite operation of said first mentioned actuating means.

24. In liquid delivery apparatus, a delivery line including a hose having a nozzle and an actuating handle on said nozzle, a support for said nozzle, an electric pump connected to supply liquid to said delivery line, a switch for controlling said pump located at a point removed from the nozzle, a flexible mechanical connection along the hose for operating said switch from the nozzle handle and a loose coupling in said drive connections from the nozzle handle to the switch inoperative when said nozzle is on said support, but adapted to be rendered positively operative upon removal of said nozzle from said support with predetermined movement of the latter.

25. In a liquid dispensing system, the combination of a liquid supply line; a pump in communication with said supply line; valve controlled outlet connections in said pump; a meter rigidly connected to and in communication with each of said outlet connections; a hose in communication with each of said meters; a nozzle on each of said hose; a motor for operating said pump; a switch in connection with said motor carried by the casing of said pump; a supporting means for each of said nozzles; means associated with said supporting means for opening the valves in said pump outlet connections and causing clutching engagement of said switch upon manually raising said supporting means when releasing the nozzles therefrom; and manually operable means associated with each of said nozzles for simultaneously operating said switch through said clutching means and permitting the flow of liquid therefrom.

26. In a gasoline dispensing system, a rotary pump; a motor operatively connected with said pump; valve housings in communication with said pump; a valve in each of said housings; each of said valves normally closed by yieldable means; a meter in communication with each of said housings and supported thereon; a delivery hose in communication with each of said meters; a nozzle carried by the end of each of said hose; a switch means supported by said pump; said switch means embodying clutch mechanism; a hook support for each of said nozzles; means operative upon manual manipulation of either of said hook supports upon release of the nozzle therefrom for opening one of said valves in the associated valve housing and simultaneously permitting clutching engagement of said clutch means; and manually operable means associated with each of said nozzles for operating said switch and permitting the flow of gasoline therefrom.

27. In a gasoline dispensing system, the combination of a plurality of discharging means; a meter in communication with each of each discharging means; a single pump for supplying liquid to all of said meters; valves for controlling the flow of liquid from said pump to said meters; said pump, meters and valves being arranged immediately adjacent each to the other and rigidly connected together; power means operatively connected with said pump; a switch for controlling the operation of said power means mounted on the casing of said pump; clutch means normally maintaining said switch in inoperative condition; manually operable means for simultaneously operating said valves and causing engagement of said clutch means for placing said switch in condition for operation; and means associated with said discharge means for simultaneously operating said switch and permitting the flow of gasoline from said discharge means.

28. A liquid dispensing system, including a delivery hose, means to supply liquid under pressure to said hose, a valve to control the flow of liquid from said hose, mechanism to initiate the operation of said means, and elements interconnecting said valve and mechanism to cause said valve to open to a substantial degree and to then operate said mechanism, and another automatically acting valve to prevent the discharge of liquid from said hose when said first valve is opened.

29. In a liquid dispensing system, a discharge hose, a discharge nozzle connected thereto, including a dividing wall having an opening therethrough, two valves in said nozzle seating on opposite sides of said wall, manually operated means for opening one of said valves, and means for yieldingly holding the other valve closed, said valve being opened by fluid pressure.

30. In a liquid dispensing system, the combination of a liquid supply line; a pump in communication with said supply line for pumping liquid therethrough; a meter associated with said pump; a discharge hose in communication with said meter; a by-pass around said pump, and a pressure regulator for controlling said by-pass, said regulator being subjected to discharge pressure of said pump and shielded from supply pressure.

31. In a liquid dispensing system a rotary pump; a casing; a rotor disposed in said casing; an inlet connection and an outlet connection in said casing; a meter connected to said outlet; a discharge hose in communication with said meter; and a by-pass in said casing operable by liquid pressure to cause circulation of liquid around said pump; said by-pass comprising valve means including a valve disc and a follower; said follower being of larger diameter than said disc whereby when said valve is opened by liquid pressure it will remain open until a material decrease in pressure to which said valve means is subjected, said follower having means thereon for shielding said valve disc and follower from said inlet connection.

32. A liquid dispensing system including supply means, a pump, a plurality of delivery conduits connected to said pump, a meter in each delivery conduit, said pump being of sufficient capacity to supply all of said delivery conduits simultaneously at maximum efficiency for said meters, a by-pass around said pump, a pressure regulator controlling said by-pass, said regulator having a movable member subjected to the delivery pressure of said pump on one side thereof, and means to shield the reverse side of said movable member from pressure variations in the supply side of said pump.

33. A liquid dispensing system comprising a pump, means to supply liquid thereto, a chamber in communication with the outlet of said pump, a plurality of discharge conduits in communication with said chamber, a by-pass connecting said supply means and said chamber, a valve controlling flow through said by-pass, said valve arranged to open when pressure in said chamber exceeds a predetermined value, means for shielding said valve from supply pressure, adjustable means for applying a yielding pressure opposing opening of said valve, and a casing enclosing said adjustable means and excluding the liquid therefrom in all positions of said valve.

34. In a gasoline dispensing system, the combination of a vertically disposed casing for housing combined power, pump, piping and metering means supported on a base support; a member supported on the outer end of said casing; a register casing supported on said member; a sight glass supported by each opposite wall of said first casing adjacent said member and connected with said piping; a register mounted in each opposite wall of said second casing adjacent said member; drive connections between said metering means and said registers; slots in said member and in said register casing; and a common source of illumination within said casing member for illuminating said sight glasses and said registers through said slots.

35. In a gasoline dispensing system, the combination of a base support; a vertically disposed casing supported at the inner end thereof on said base support; a member supported on the outer end of said casing; a casing supported on said member; power, pump and metering means rigidly connected together and arranged within said first casing; a register mounted in each opposite wall of said second casing adjacent said member; drive connections between said meters and said registers; slots in said member and in said second casing; and lights within said member arranged in position for illuminating said sight glasses and said registers through said slots.

36. A liquid dispensing apparatus comprising a housing; a motor, and a pump driven thereby; a conduit connected to said pump and having a valve therein; a hose leading from said conduit; and a dispensing nozzle at one end of said hose; means for operating said valve; a spring switch for said motor comprising a rotatable switch shaft, a yieldable clutch associated with said switch shaft; an arm secured to said valve operating means; a lever pivotally supported in said housing; a rod connecting the inner end of said lever with said arm; a second arm loosely mounted on said valve operating means and limited in movement by said first arm; a second lever normally maintaining said clutch in inoperative position by engagement of said second arm therewith; and a Bowden wire associated with said nozzle for operating said switch and providing a flow of liquid from said nozzle.

LYON McCANDLESS.